March 27, 1962 C. F. ENSOR ETAL 3,026,721
DEVICE FOR TESTING BRAKE LINING BOND
Filed Oct. 28, 1959 3 Sheets-Sheet 1

INVENTORS
CLYDE F. ENSOR
WILLIAM R. WILBURN
BY Arthur Robert
ATTORNEY

March 27, 1962  C. F. ENSOR ETAL  3,026,721
DEVICE FOR TESTING BRAKE LINING BOND
Filed Oct. 28, 1959  3 Sheets-Sheet 2

INVENTORS
CLYDE F. ENSOR
WILLIAM R. WILBURN

BY Arthur J. Robert
ATTORNEY

March 27, 1962 C. F. ENSOR ETAL 3,026,721
DEVICE FOR TESTING BRAKE LINING BOND
Filed Oct. 28, 1959 3 Sheets-Sheet 3
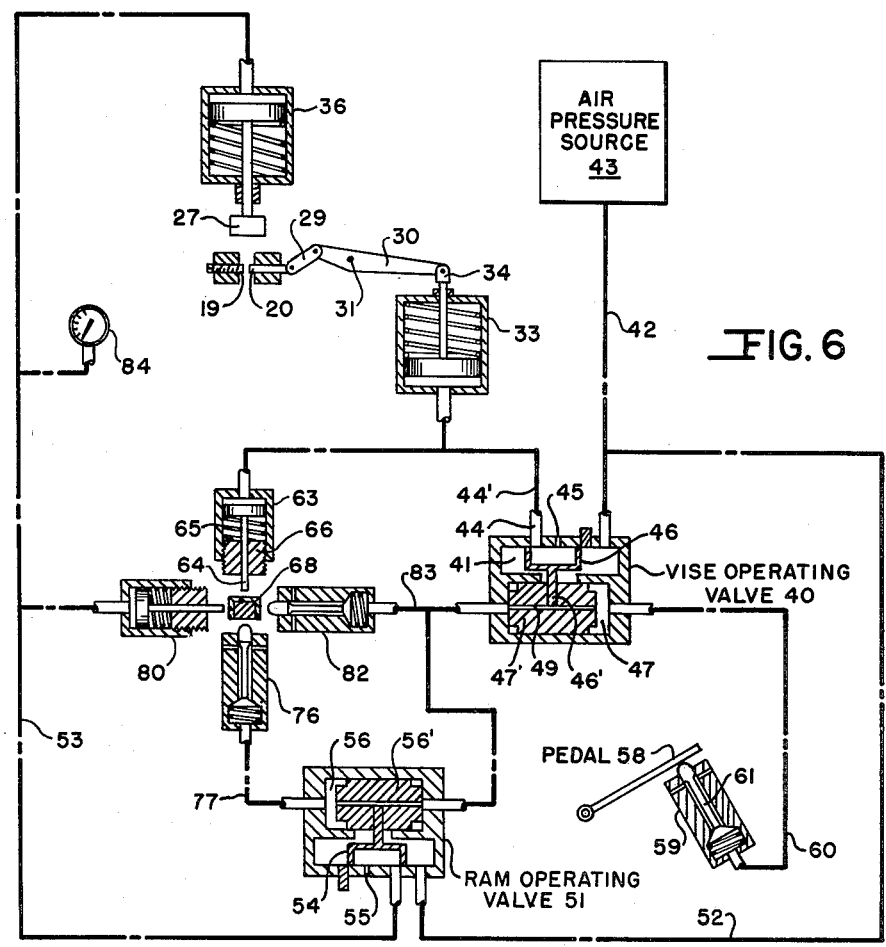
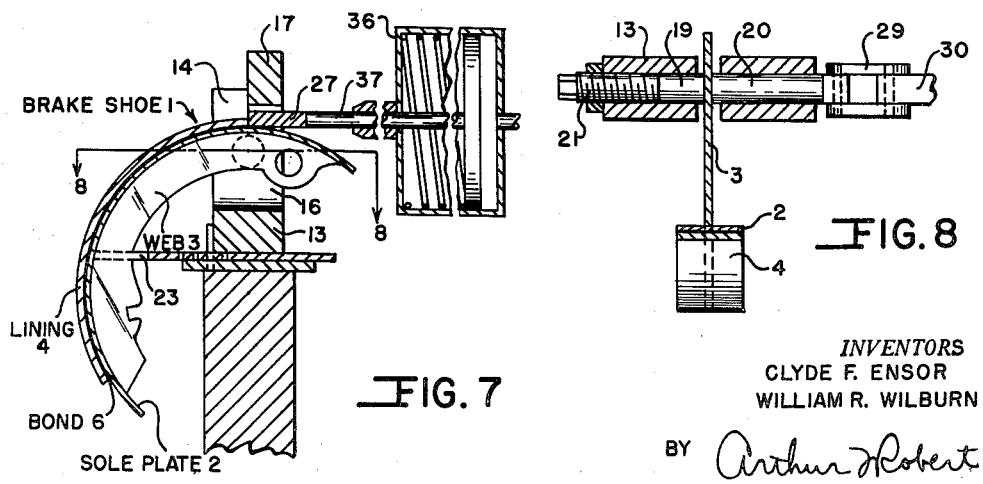
INVENTORS
CLYDE F. ENSOR
WILLIAM R. WILBURN
BY *Arthur H. Robert*
ATTORNEY

United States Patent Office 3,026,721
Patented Mar. 27, 1962

3,026,721
DEVICE FOR TESTING BRAKE LINING BOND
Clyde F. Ensor and William R. Wilburn, Louisville, Ky., assignors to Hesco Parts Corporation, Louisville, Ky., a corporation of Kentucky
Filed Oct. 28, 1959, Ser. No. 849,343
6 Claims. (Cl. 73—101)

This invention relates to a machine for testing the sufficiency of the adhesive bond between a bonded brake lining and its brake shoe.

A conventional machine for testing bonded brake shoes comprises: (1) a frame having a brake shoe receiving space; (2) a stationary abutment on said frame at one side of said space, said abutment acting as a stop for a brake shoe in said space; and a pneumatically operated ram on said frame at the other side of said space, for exerting a transverse or sidewise test force in the direction of said abutment and applying it as a shearing force to a small (one inch long) portion of the adjacent side edge of the brake lining. In operating this conventional machine, we have found that the ram often dents the brake lining badly or tears a small piece from it. Usually this occurs with a force lower than that required to provide an adequate test of the shear strength of the brake lining bond. This results in an inaccurate test not only of the shear strength of the bond but also of the shear or tear strength of the lining itself because, as is well known, the bond will normally shear before the lining will shear or tear. Furthermore, the fact that the test often dents the lining renders the test impractical for use on a production line.

There are probably several reasons for the inadequacy and inaccuracy of this type of testing machine. One may be due to the fact that the transverse forces, purposely applied to the lining under test, are at right angles to the longitudinal forces normally applied to the brake lining under regular operating conditions. Another reason may be due to the fact that the operative face of the ram is of rectangular cross-section; hence, it extends tangentially to the curvature of the brake shoe and therefore applies a shearing force directly to the bond at the tangential point only. It is impractical to shape or curve the ram to the curvature of a particular brake shoe because the machine would then be limited to use in testing one size of brake shoe only.

A principal object of this invention is to eliminate the foregoing objections and deficiencies or minimize them in a substantial measure and, more particularly, to provide a testing machine which can accurately and adequately test the shear strength of a brake lining bond without noticeably damaging the brake lining itself.

Another important object of this invention is to provide a machine for testing the shear strength of a brake lining bond by applying, to that bond, forces which are adequate to test the bond and which more truly stimulate the longitudinal forces normally applied to the brake lining under regular operating conditions.

Other important objects are: to provide a brake lining testing machine which is simple and inexpensive to construct, easy to install and operate and fast in operation; to provide one which may be used on a production line for testing all shoes in a production run; to provide a manually loading machine which will operate automatically to carry out the test; and to provide one capable of testing various sizes of brake shoes over a wide range.

Broadly speaking these objects may be achieved simply by providing a machine for applying the test force directly and uniformly to the rectangular end face at one end of a bonded brake lining so that the shearing forces are applied longitudinally to the bond across the full width of the lining. This provides a substantially accurate determination of the shear strength of the brake lining bond. In addition, the sufficiency of the brake lining bond can normally be determined without damaging the brake lining. Hence, our machine may be used on a production line to test each brake shoe.

Our machine may briefly be described as comprising: a frame having a brake shoe receiving space; brake shoe holding means mounted on the frame at opposite sides of said space for relative movement toward and away from each other between a closed brake shoe clamping position, wherein they project into said space, and an open brake shoe releasing position, said brake shoe holding means being operative, in said closed position, to secure the brake shoe firmly to the frame with one end face of its brake lining located at a predetermined position; a ram mounted on said frame for relative movement longitudinally of said brake shoe into flush engagement with said one end face of said lining; and means for moving said ram to apply, against said one end face, a predetermined bond-testing force.

Our machine includes an automatic control means for directing and controlling it in a manner causing it automatically to perform all test operations after it is manually loaded by the operator.

One embodiment of the invention is illustrated in the accompanying drawings, wherein:

FIG. 6 is a schematic diagram of the pneumatic control system of the machine;

FIG. 7 is an enlarged section taken on line 7—7 of FIG. 2 having portions broken away and showing a brake shoe under test; and FIG. 8 is a section taken on line 8—8 of FIG. 7.

Figure 1:
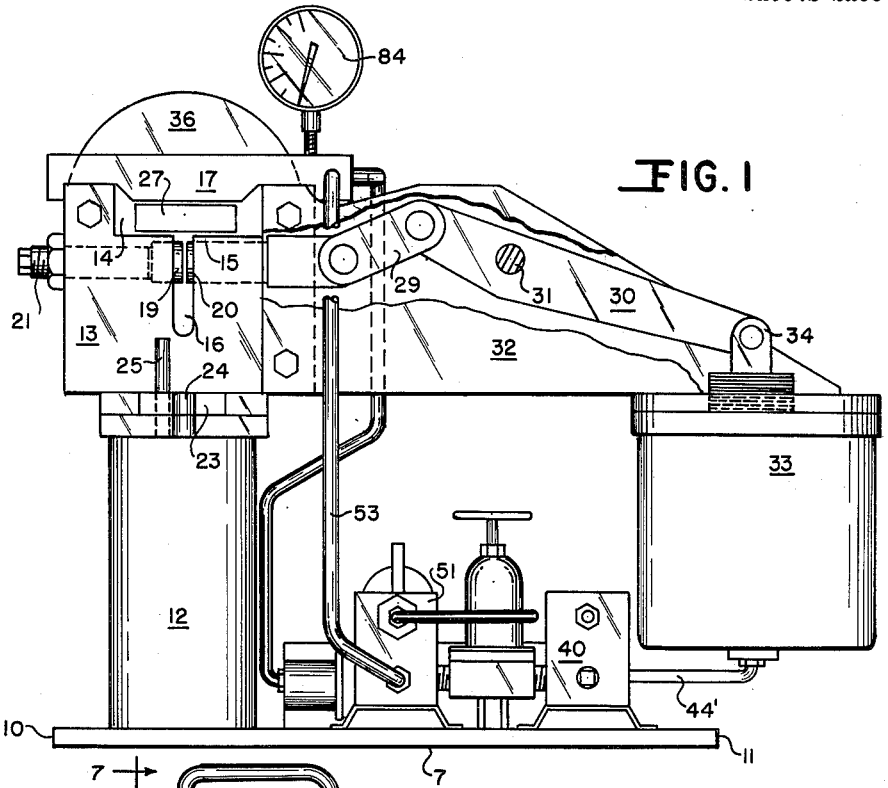
FIG. 1 is a side elevation of the testing machine with portions being cut away.
Figure 2:
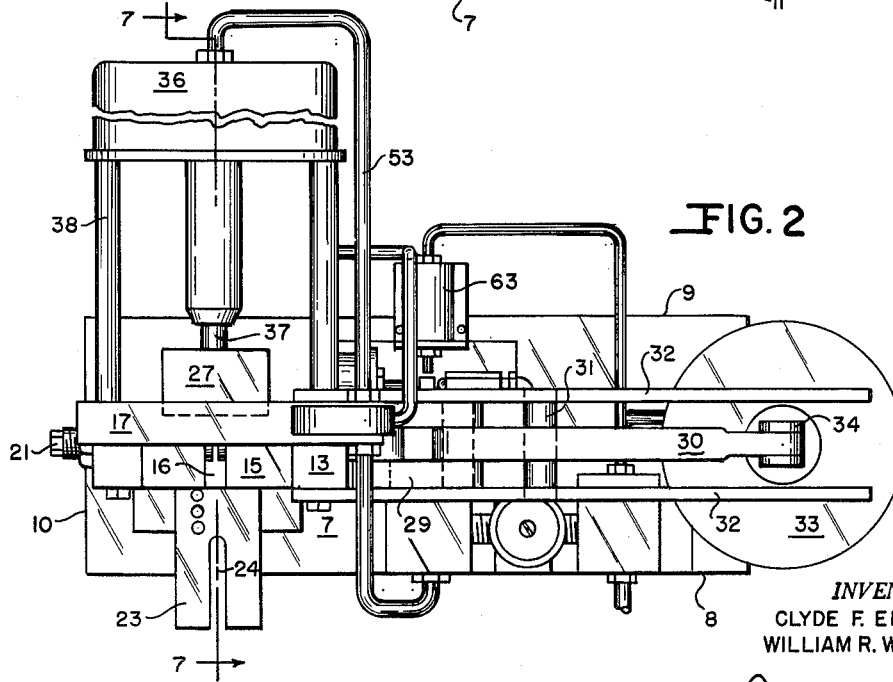
FIG. 2 is a top plan view thereof.
Figure 3:
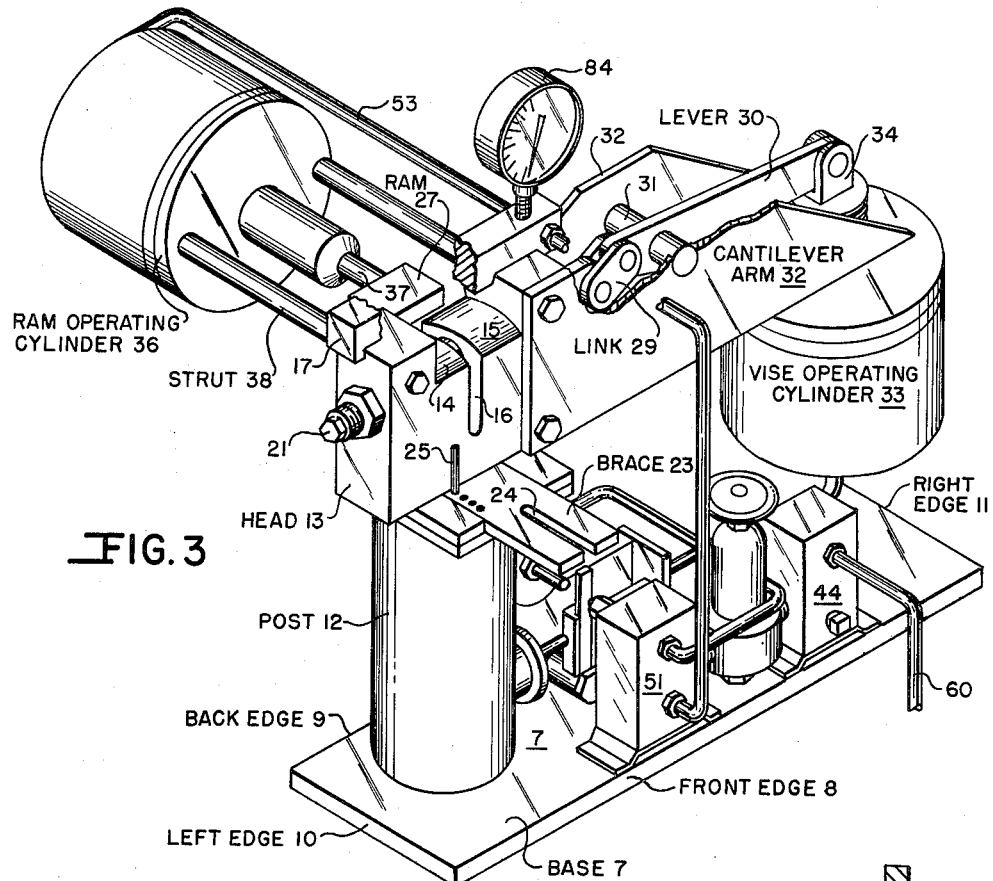
FIG. 3 is a perspective view of the machine with portions being cut away.

The machine illustrated in the drawing is designed for testing a conventional automobile brake shoe 1, which may be generally described as extending longitudinally along an arcuate path and having a T-shaped transverse cross section. Brake shoes of this description comprise: an arcuately extending sole plate 2, corresponding to the bar of the T; a similarly extending integral web 3, corresponding to the stem of the T; and a brake lining 4 bonded to the outer face of the sole plate 2 by an adhesive bonding material 6.

The machine illustrated includes: (1) a frame; (2) a vise or clamp for holding one end of a brake shoe; (3) an adjustable brace for restraining the other end of the brake shoe in the vise; (4) a test ram; (5) means for operating the vise to clamp a brake shoe in its operative test position; (6) means for operating the ram to test the lining; and (7) an automatic control system for initiating and controlling the operation of the vise and ram operating means.

FRAME

The frame 7 of the test machine includes a flat rectangular base, also designated 7, having a front edge 8, a back edge 9, a left edge 10 and a right edge 11. A cylindrical post 12 is mounted on the base 7 near its left edge 10 to extend vertically upward from it. A head 13 is mounted on top of the post 12 and contains a T-shaped space or groove 14 having a vertically deep horizontal bar which opens upwardly and a relatively horizontally narrow depending stem.

The T-shaped groove 14 extends between the front and back of the head 13 and, as seen in FIG. 7, is adapted and shaped to receive one end portion of a conventional brake shoe 1. The upwardly open horizontal bar space, also designated 14, of the T-shaped groove 14 is bordered along its bottom by a convex floor 15 curving between the front and the rear of the head. When a brake shoe 1 is properly positioned in groove 14, its sole plate 2 rests upon the floor while the adjacent portion of its web 3 depends into the stem 16 of the groove.

A cross bar 17 is mounted on the top of the head 13 at the rear thereof to span the bar of the T-shaped slot 14 at an elevation above the end of an operatively positioned brake shoe.

VISE

The vise, which holds the shoe during the testing operation, includes a fixed jaw 19 and a movable jaw 20 which are mounted in the head 13 at opposite sides of the stem 16 of the T-shaped groove 14 for relative closing and opening movements. They are intended to close against opposite sides of a brake shoe web 3 in the stem 16 and thereby lock or clamp the brake shoe 1 in its operative or proper position for testing.

The fixed jaw 19 is in the form of a cylindrical plug seated in a socket which opens through the left interior wall forming the stem space 16. An adjusting screw 21 is threaded through the left end of the head 13 and engages the end of the jaw 19 for adjusting the jaw 19 to project into the stem space 16 a desired distance. A lock nut is threaded on the outer end of the screw 21 for locking it in position after the jaw 19 is properly adjusted.

The movable jaw 20 is a horizontally elongated cylindrical shaft slidably seated in a horizontal guiding hole which extends from the right end of the head 13 to and through the right wall of the stem space 16. The jaw 20 is horizontally aligned with the fixed jaw 19. The opposed ends of the jaws 19 and 20 are abraded or otherwise roughened to aid them in tightly gripping a brake shoe web 3 between them. The outer end of the jaw 20 projects beyond the right end of the head 13 and is connected to an operating mechanism.

ADJUSTABLE BRACE

The brace cooperates with the vise to hold the shoe against movement when the testing force is applied. This brace 23 extends horizontally and is slidably mounted on the top of the cylindrical post 12 but underneath the head 13, to project forwardly from the frame 7. The projecting front or free end of the brace 23 is forked or bifurcated to provide a slot 24 for receiving the web 3 of an operatively positioned shoe. The forked ends of the brace 23 engage and support the inner face of the brake shoe sole plate 2. This restrains the shoe from swinging downwardly, about the vise jaws 19 and 20 as an axis, during a test.

The brace 23 is adjustable for supporting various sizes of brake shoes. This adjustment is provided by the slidable connection between it and the frame, which allows it to project various distances forwardly in front of the head 13, and a latching means for locking it in different positions. In the drawing, this latching means is the pin 25 which extends downwardly through the selected one of a series of holes in the brace 23 and into an aligned hole provided under the brace.

TEST RAM

The test ram 27 is in the form of a rectangular block mounted, at the back of the head 13, for horizontal reciprocating movement in the forward force-applying and backward directions. It moves forward in the bar space 14 of the T-shaped slot to engage and apply force to the end edge of a brake lining 4 bonded on a brake shoe 1 clamped in the head 13. The operative face of the ram 27 extends parallel to the end face of the brake lining. When the brake shoe 1 is correctly positioned in the head 13, the ram should have flush engagement with the brake lining end horizontally throughout the full width thereof and vertically throughout its full thickness or depth. The ram 27 is supported by a ram operating means.

VISE OPERATING MEANS

The clamp jaws of the vise are opened and closed by connecting the movable jaw 20 through a linkage to an operating cylinder. The linkage largely comprises link 29 and lever 30.

Accordingly, the outer end of the movable jaw 20 is pivoted to one end of a link 29 which is pivoted, at its other end, to the left end of a horizontal lever 30 of the first order. The lever 30 is pivoted intermediate its ends on a pin 31. Horizontal cantilever arms 32 are mounted on and project from the right end of the head 13 on the opposite sides of the lever 30. The pin 31 extends between and is supported on the cantilever arms 32. In the open or retracted position of the jaw 20, the link 29 and the left end portion of the lever 30 form a bent knee pointing upward. Pushing the outer or right end of the lever 30 upward swings its inner or left end downward to straighten the knee and push the movable jaw 20 to the left and toward the fixed jaw 19. Pulling the outer end of the lever 30 downward again bends the knee upwardly and opens the jaw 20.

The operating cylinder is in the form of a pneumatic cylinder 33 vertically mounted on the outer ends of a pair of cantilever arms 32 with its upwardly projecting piston rod 34 pivoted to the outer end of horizontal lever 30. This cylinder 33 operates through the linkage to close the jaws when air pressure is introduced into it, the piston rod 34 being thereby extended upwardly. Upon the release of such air pressure an internal spring in the cylinder 33 becomes effective to retract the piston rod 34 and open the jaws 19 and 20.

RAM OPERATING MEANS

The ram is operated by another pneumatic cylinder 36, which is horizontally mounted at the back of (and in spaced relation to) the head 13 with its piston rod 37 projecting forward. The ram 27 is fixed on and is carried by the front end of the piston rod 37. Suitable struts 38 extend between the head 13 and cylinder 36 to support the cylinder on the head.

The cylinder 36 operates in the same manner as the cylinder 33, which is to say that it is extended by air pressure and retracted by a spring.

AUTOMATIC CONTROL SYSTEM

The automatic control system operates, once a brake shoe is manually positioned in the machine and the control system is started or triggered, to direct and control the machine through the test cycle on that brake shoe. This test cycle includes: closing the vise jaws on the brake shoe with a predetermined securing force; after that predetermined securing force is reached, pushing the ram against one end of the brake lining with a predetermined bond-testing force; and after that predetermined bond-testing force is reached, simultaneously retracting the ram and opening the vise jaws to release the brake shoe. The automatic control system includes: a vise-operating pneumatic valve; a ram-operating pneumatic valve; a start-test switch means for opening the vise-operating valve; an intermediate-test switch means for opening the ram-operating valve; and a complete-test switch means for simultaneously closing both the valves.

VISE-OPERATING VALVE

The vise-operating valve is movable between a vise-opening position, wherein it exhausts air pressure from the vise-operating cylinder causing it to open the vise jaws 19 and 20, and a vise-closing position, wherein it supplies air pressure to the vise-operating cylinder 33 causing it to close the vise jaws 19 and 20.

The vise-operating valve 40 is a conventional pneumatic valve having an internal pneumatic actuating means controlled by remotely located pneumatic switches for shifting it between alternate positions, one position admitting air pressure to an outlet and another position exhausting that outlet to atmosphere. This valve is sold under the trade name "Meadmatic" by the Mead Specialties Co., Chicago, Ill.

Looking at FIG. 6, the valve 40 includes an air control chamber 41 connected by a conduit 42 to an air pressure supply source 43. The chamber 41 includes an outlet port 44, connected to a conduit 44' running to the vise-operating cylinder 33, and an exhaust port 45 connected to atmosphere. A reciprocating shuttle 46 is housed in the chamber 41 and moves between alternate positions. In one position, it admits air pressure to the outlet port 44 and seals that port from the exhaust port 45. In its other position, it closes off the outlet port 44 from the air pressure in the chamber and connects the two ports 44 and 45, for exhausting the outlet port 44. The shuttle 46 is shown in this latter position in FIG. 6.

The valve 40 also includes a second chamber 47 housing a reciprocating free piston 47' for moving the shuttle 46 between its alternate positions. The piston 47' and shuttle 46 are connected together by a stem 46' fixed on the shuttle and seated in a radially extending hole in the piston 47'. The piston 47' also includes a small longitudinal or axial bore 49 extending between its ends and the radial hole in the piston connects with this bore 49. This allows air pressure in the chamber 41 to leak through the radial hole and the bore 49 to the piston ends. The piston 47' depends on this controlled leakage for its operation.

Normally, the air pressure at both ends of the piston 47' is equal and balanced so that the piston remains stationary. However, if the air pressure is quickly exhausted from an end of the piston chamber 47, the air pressure at that end of the piston 47' drops creating a differential of air pressure at its opposite ends. The bore 49 is made sufficiently small so that the air pressures at the opposite ends of the piston 47' cannot neutralize or compensate each other quickly. This differential of air pressure biases the piston 47' toward the exhausted end of the chamber 47. If the piston 47' is positioned at the other end of its chamber 47 from the exhausted end, it moves to the exhausted end. Of course, if it is already at the exhausted end of its chamber, it cannot and does not move. Consequently, the piston 47' and the shuttle 46 can be moved back and forth by exhausting the proper ends of the piston chamber 47. The exhaustion of the opposite ends of the piston chamber is performed by small exhaust valves termed pneumatic switches mounted at remote locations and connected to the ends of the piston chamber by small hoses.

RAM-OPERATING VALVE

The ram-operating valve 51 is movable between a ram-retracting position, wherein it exhausts air pressure from the ram-operating cylinder 36, causing it to retract the ram 27, and a ram-extending position, wherein it supplies air pressure to the cylinder 36 causing it to extend the ram 27.

The valve 51 for operating the ram cylinder 36 is identical to the vise-operating valve 40. Hence, it should be sufficient to say that it includes: an air chamber connected by a conduit 52 to the air pressure source 43; an outlet port connected by a conduit 53 to the ram-operating cylinder 36; a shuttle 54 for alternately admitting air pressure to the conduit 53 and exhausting that conduit through an exhaust port 55; and a second chamber 56 housing a free piston 56' for moving the shuttle 54 between its alternate positions in response to pneumatic switches connected to the ends of the piston chamber.

With the piston 56' at the right end of its chamber 56, as seen in FIG. 6, the shuttle 54 exhausts the conduit 53 to atmosphere through the exhaust port 55 and closes it to the air pressure. In its alternate position, with the piston at the left end of its chamber, the shuttle 54 connects the conduit 53 to the air pressure in the air chamber and disconnects it from the exhaust port 55.

START-TEST SWITCH MEANS

This means, when manually actuated, controls the vise-operating valve 40 to move to a vise-closing position and, in effect, starts or triggers the control system to run through one test cycle. This means includes a foot pedal 58 which operates an exhaust valve switch 59 connected by a hose 60 to the right end of the piston chamber 47 of valve 40 as seen in FIG. 6. The exhaust switch 59 includes a spring-extended plunger 61 which, normally closes or disconnects the hose 60 from the atmosphere, when pressed inwardly by the pedal 58, connects the adjacent end of the hose 60 to atmosphere.

With the piston 47' of the vise-operating valve 40 in its left position, as seen in FIG. 6, and the shuttle 46 exhausting the outlet port 44, the hose 60 can be exhausted and switch 59 opened by depressing the pedal 58. When the hose 60 and the right end of the piston cylinder 47 are exhausted, the piston 47' will move to the right end. This moves the shuttle 46 to the right to admit air pressure to the vise-operating cylinder 33, causing it to close the vise jaws 19 and 20.

INTERMEDIATE-TEST SWITCH MEANS

This means is activated by the rise of air pressure, supplied to the vise-operating cylinder 33, to a predetermined value and, when activated, controls the ram-operating valve 51 to move to a ram-extending position. This means includes: a back control cylinder; a joy stick; and a front pneumatic switch.

BACK CONTROL CYLINDER

The back control cylinder 63 is extended by the air pressure supplied to the vise-operating cylinder 33 to strike and move the joy stick forwardly causing it to activate the front switch and move the ram-operating valve to its ram-extending position. The back control cylinder 63 is simply a small pneumatic cylinder including: a piston rod 64 which is extended upon the application of air pressure; a strong internal spring 65 biasing the piston rod 64 to a retracted position; and an adjustable nut 66 for varying the tension of the spring 65. The nut 66 is adjusted so that the spring 65 keeps the piston rod 64 from extending its full amount until a predetermined air pressure is applied to the control cylinder 63.

The back control cylinder 63 is connected to the conduit 44' operating the vise-operating cylinder 33. Consequently, admission of air pressure to the conduit 44' also operates the control cylinder 63 simultaneously with the vise-operating cylinder 33.

JOY STICK

The joy stick 68, in addition to being movable forwardly by the back control cylinder 63 to activate the front switch, is also movable left to right by other means as will be explained later.

Figure 4:
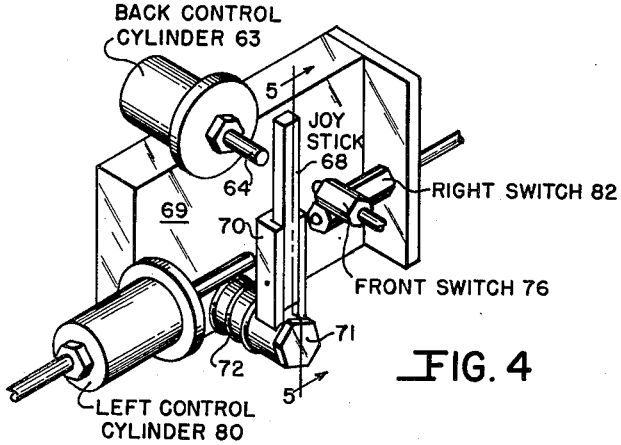
FIG. 4 is an enlarged fragmentary view showing the relationship of certain parts of the automatic control system for the machine.
Figure 5:
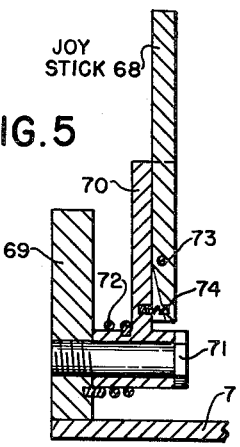
FIG. 5 is an enlarged section taken on lines 5—5 of FIG. 4.

The joy stick 68, as seen in FIGS. 4 and 5, is an upwardly projecting stick pivoted at its bottom for swinging in a vertical plane extending between the back 9 and the front 8 of the frame 7 and in another vertical plane extending at right angles to the first between the left and right ends 10 and 11 of the frame. The joy stick 68 and its mounting includes: a vertical plate 69 mounted on and extending upwardly from the back of the base 7; a lower joy stick portion 70 pivoted on a horizontal axis bolt 71 extending between the front and back of the base and mounted on the front face of the plate 69; a spring 72 on the lower joy stick portion 70 biasing it about the bolt 71 to a vertically upstanding position; an upper joy stick portion, also designated 68, carried by and pivoted on the lower portion 70 about a horizontal tilting axis 73 extending at right angles to the axis 71; and a spring 74 biasing the upper portion 68 about the axis 73 to a vertical position on the lower portion 70.

The back control cylinder 63 is mounted behind the joy stick 68 and the extension of its piston rod 64 engages the upper joy stick portion 68 and swings it forwardly to engage and open a front exhaust valve switch 76 controlling the operation of the ram-operating valve 51.

FRONT PNEUMATIC SWITCH

The front pneumatic switch 76, when activated and opened by the joy stick 68, moves the ram-operating valve 51 to its ram-extending position. The front switch 76 is identical with the start switch 59 and is connected by a hose 77 to the left end, as seen in FIG. 6 of the piston chamber 56 in the ram-operating valve 51. It is mounted in front of the joy stick 68 where the swinging movement forward of the upper joy stick portion 68, caused by the control cylinder 63, engages and operates it. The depression of the plunger of the switch 76, opens it and exhausts the left end of the piston chamber of the valve 51 to the atmosphere, resulting in shifting the valve shuttle 54 to the left and admitting air pressure to the ram-operating cylinder 36. This extends the ram 27. The back control cylinder 63 does not push the joy stick 68 forward enough to open the front switch 76 until the pressure in the vise-operating conduit reaches a predetermined value, which normally is high enough to close the vise jaws 19 and 20 sufficiently tight to hold a brake shoe securely.

COMPLETE-TEST SWITCH MEANS

This means is activated by the rise of air pressure, supplied to the ram-operating cylinder 36, to a predetermined value and, when activated, simultaneously returns the ram-operating valve to its ram-retracting position and the vise-operating valve to its vise-opening position. This means includes: a left control cylinder; and a right pneumatic switch.

LEFT CONTROL CYLINDER

The left control cylinder 80 is extended by the air pressure supplied to the ram-operating cylinder 36 to strike and move the joy stick 68 from left to right to de-activate the front pneumatic switch 76 and to strike and activate the right pneumatic switch. The left control cylinder 80 is identical with the back control cylinder 63 and is mounted to the left of the joy stick 68, somewhat below the level of the back control cylinder 63 so that its piston rod engages the lower portion 70 of the joy stick and swings it to the right about the axis 71. This movement swings the upper portion of the joy stick from between the back control cylinder 63 and the front switch 76.

The left control cylinder 80 is connected to the conduit 53 operating the ram-operating cylinder 36 so that both of these cylinders are simultaneously supplied with air pressure. Like the back control cylinder 63, the left control cylinder 80 is adjusted so that its piston rod does not reach its full extension until a predetermined pressure is reached, which usually is the maximum pressure supplied to the ram cylinder 36.

RIGHT PNEUMATIC SWITCH

The right pneumatic switch, when engaged and activated by the joy stick 68, simultaneously moves the ram-operating valve 51 to its ram-retracting position and the vise-operating valve 40 to its vise-opening position.

This pneumatic switch 82 is identical with the start switch 59 and the front switch 76. It is mounted to the right of the joy stick 68 where it can be engaged and opened by the lower portion 70 of the joy stick, as it is swung to the right by the left control cylinder 80. The switch 82 is connected by a hose 83 to the left end of the vise-operating valve 40 and to the right end of the ram-operating valve 51. When it is opened, it shifts both the valves 40 and 51 back to their original positions, wherein the air pressure on both the vise and ram-operating cylinders 33 and 36 is released. The left control cylinder 80 does not open the right switch 82 until the air pressure on the ram cylinder 36 reaches a predetermined high value.

To determine the air pressure acting on the ram cylinder 36, a pressure gauge 84 is connected to the conduit 53 running to that cylinder.

Operation

At the start of operation, we assume that the adjustable brace 23 is properly adjusted for the size of brake shoe being tested; that the fixed jaw 19 and its adjusting screw 21 are correctly adjusted so that the brake shoe web 3 can be clamped between the vise jaws 19 and 20; and that the back control cylinder 63 and the left control cylinder 80 are adjusted to actuate their switches 76 and 82 under 50 p.s.i. air pressure.

The operator stands in front of the machine and inserts one end of the brake shoe 1, with the lining 4 facing upwardly, into the T-shaped slot 14 in the head 13. The shoe 1 is pushed rearwardly in the slot 14 until the rear end of the brake lining 4 is located directly under the front edge of the cross-bar 17, positioned over the slot 14, and the shoe 1 is resting on the brace 23, with its web 3 received in the brace slot 24. The operator holds the brake shoe in this position while he starts the test cycle.

The test is started by the operator pressing the start-test pedal 58 which is normally located adjacent the operator's feet. Depressing the pedal 58 opens the pneumatic switch 59 to cause the exhaust of the right end, (as seen in FIG. 6) of the piston chamber 47 of the vise-operating valve 40. This moves its piston 47' and shuttle 46 to the right and admits air pressure to the vise-operating cylinder 33, resulting in moving the jaw 20 to the left to close the vise jaws 19 and 20 on the brake shoe web 3. This locks the brake shoe securely in the machine.

The application of air pressure to the vise-operating cylinder 33 also applies the same pressure to the back control cylinder 63 which is extended forwardly against its internal spring 65 to engage the upper portion 68 of the joy stick, swing it forwardly about the axis 73 toward the front switch 76. At a predetermined value of air pressure, which we have assumed to be 50 p.s.i., the joy stick 68 is swung sufficiently far enough forward to engage and open the front switch 76. At this time the brake shoe 1 is securely clamped in the vise jaws.

The opening of the front switch 76 exhausts the left end of the piston chamber 56 of the ram-operating valve 51 and causes its piston 56' and shuttle 54 to move to the left, as seen in FIG. 6, wherein air pressure is admitted through the conduit 53 to the ram-operating cylinder 36. The ram 27 is pushed forwardly by the cylinder 36 against the end of the brake lining 4 with a force determined by the size of the cylinder piston and the value of air pressure.

We assume that the machine is adjusted to apply 50 p.s.i. to the cylinder 36. With the piston of the cylinder 36 having a 5 inch diameter, this 50 p.s.i. will apply about 1000 lbs. to the ram 27. We have found that this load will provide a satisfactory test for most brake shoes. In other words, if the brake lining bond layer 6 does not shear under a 1000 lbs. load applied to its end, it is strong enough to withstand operating loads without shearing.

The operator can view the gauge 84 to observe the air pressure applied to the cylinder 36 if he desires, although normally he does not do this after the machine is correctly adjusted.

The application of air pressure to the ram-operating cylinder 36 also applies air pressure to the left control cylinder 80. The cylinder 80 pushes against the lower portion 70 of the joy stick to swing it to the right, toward the right switch 82, from between the back control cylinder 63 and the front switch 76. Once, the joy stick clears the front switch 76, that switch is again closed. As the air pressure reaches 50 p.s.i., the control cylinder 80 swings the joy stick lower portion 70 into engagement with the right switch 82. As explained before, the control cylinder 80 is adjusted so that it is only extended far enough to do this when the air pressure reaches 50 p.s.i.

Opening the right switch 82 returns both the valves 40 and 51 to their original positions. More particularly, the piston 47' of the valve 40 moves to its left position and the piston 56' of the valve 51 moves to its right position, the valves 40 and 51 being shown in FIG. 6 in these positions. This shuts off the air pressure to both the vise-operating cylinder 33 and the ram-operating cylinder 36 and exhausts these cylinders to the atmosphere. As a result, the ram 27 is retracted rearwardly and the vise jaws 19 and 20 are opened. The brake shoe 1 is now free to be removed from the machine. Once this is done, the machine is ready to receive another brake shoe for testing by repeating the foregoing steps.

Having described our invention, we claim:

1. A machine for testing the strength of a bond adhesively securing a brake lining to a brake shoe, comprising: a frame having a brake shoe receiving space; shoe holding means mounted on the frame, at opposite sides of said space, for relative movement toward and away from each other between a closed brake shoe clamping position, wherein they project into said space, and an open brake shoe releasing position, said shoe holding means being operative, in said closure position, to secure the brake shoe firmly to the frame with one end face of its lining located at a predetermined position; a ram mounted on said frame for relative movement longitudinally of said brake shoe into flush engagement with said one end face of said lining; and means for moving said ram to apply, against said one end face, a predetermined bond-testing force.

2. The machine of claim 1 wherein said shoe holding means includes: a pair of relatively movable jaws operative, in an open position to receive the web of a brake shoe; and a first fluid operated cylinder for closing said jaws to hold said shoe web.

3. The machine of claim 2 wherein: said ram is moved by a second fluid operated cylinder.

4. The machine of claim 3 including an automatic system for operating said first and second cylinders, comprising: a manually-controlled means for admitting fluid pressure to said first cylinder to close said jaws; and means operative, in response to the fluid pressure in said first cylinder rising to a predetermined pressure value, to admit fluid pressure to said second cylinder to move said ram against the lining end face.

5. The system of claim 4 including: means operative, in response to the fluid pressure in said second cylinder rising to a predetermined pressure value, to release the fluid pressure from both of said cylinders for simultaneously withdrawing said ram from said lining end face and for opening said jaws to release said brake shoe.

6. A machine for testing the strength of a bond adhesively securing a brake lining to a brake shoe which has the lining on its outer side and has a longitudinally extending web projecting radially inward on its inner side, comprising: a frame; a pair of relatively movable clamp jaws mounted on said frame and operative, in an open position, to receive an end portion of the brake shoe web adjacent one end of said shoe; a brace on said frame for engaging the inner side of said shoe intermediate the ends of said shoe and supporting it against movement toward or in the direction of said brace; means for adjustably mounting said brace on said frame for accommodating it to various sizes of brake shoes; means on said frame for closing said jaws against said shoe web to lock said shoe on said frame; a reciprocating ram mounted on said frame for movement against the end face of the brake lining at said one end of said brake shoe; and means for moving said ram against said lining end face with a predetermined value of force.

References Cited in the file of this patent

UNITED STATES PATENTS

| | | |
|---|---|---|
| 1,890,923 | Wilson | Dec. 13, 1932 |
| 2,424,177 | Laushe | July 15, 1947 |
| 2,667,781 | Barrett | Feb. 2, 1954 |